3,079,261
VITAMIN K PREMIX
Raymond Berruti, Copiague, N.Y., assignor to Heterochemical Corporation, Valley Stream, N.Y., a corporation of New York
No Drawing. Filed Apr. 11, 1960, Ser. No. 21,136
6 Claims. (Cl. 99—2)

This invention relates to a vitamin K animal feed premix, especially a poultry feed premix of improved stability.

Vitamin K is now in general use in many animal feeds, particularly in poultry feed, where its effect is to eliminate hemorrhagic disease in the birds. The preferred vitamin K active material is a water soluble menadione bisulfite adduct (MBA), for example, an alkali metal, alkaline earth metal, ammonium or an amine salt. Menadione sodium bisulfite (MSB) is an eminently satisfactory material.

Since only a few grams of MBA are required per ton of the complete animal feed to produce the desired results, it would be difficult to obtain uniform distribution of the vitamin K active material throughout the feed. The common practice is to first prepare a concentrated dilution of MBA which is added to the complete feed as the latter is prepared. This first dilution is referred to in trade as a "premix," and it has been the practice to supply a premix containing as little as 4 grams of vitamin K active material per pound. A portion of such a premix is then mixed with other ingredients to form a ton of complete chicken feed, for example. A recent development in this art has been the tendency toward more concentrated MSB premixes, for example those containing 8, 12, 16, 24, 32, 64, and even as much as 250–260 grams of the vitamin K active material per pound of premix. These multiple strength premixes are necessary to accommodate the varied formulating practices resorted to by various feed mills and concentrate formulators.

The material with which the MBA is diluted to form the premix is referred to as the "carrier." This is a material which can be tolerated by the animal and is preferably not unduly expensive. A preferred carrier is one which has nutritive value or provides minerals which are necessary to the diet i.e. a mineral supplement. A carrier of the latter type is calcite flour, but the current tendency of the industry is to avoid use of calcite for reasons enumerated hereinafter. The practice at the present time is to employ nutritive carriers, particularly soy bean meal or wheat middlings.

While the bisulfite adducts of menadione, especially MSB, are by far the most effective vitamin K active materials for poultry, it is a well known fact that an unprotected MSB premix is not capable of retaining its original vitamin K potency over long periods of time under adverse storage temperature and humidity. For example, commercially available MSB premixes assayed after several months on the shelf were found to have retained only a maximum of about 50% of their vitamin K potency, as compared with the premix at the time of its preparation. Premixes stored in warmer, more humid climatic areas have a considerably lower vitamin K potency than those stored in a cool, dry climate. Thus moisture and elevated temperature accelerate decomposition of menadione sodium bisulfite, and the feed manufacturer cannot rely upon the label to positively ascertain premix potency. He can only be relatively sure that the older the vitamin K premix the lower its actual vitamin K potency. Accordingly, a vitamin K premix of improved stability with the passage of time at elevated temperature and humidity would be hightly desirable.

As noted above, the calcite carrier has given way to the nutritive carrier, particularly soy bean meal, which affords the animal, particularly poultry, certain dietary essentials, and it has been observed that a premix consisting of menadione sodium bisulfite and soy bean meal retains its potency much more effectively than a vitamin K-calcite premix. Soy bean meal is an acidic carrier as distinguished from calcite which has a definitely alkaline reaction in the presence of moisture, and it has been assumed by many that all acidic carriers perform equally well in their inhibition of decomposition of the MBA. I have found that this is not true and that there is a vast difference in the ability of the acidic nutritive carriers to retard decomposition.

In accordance with the present invention I have discovered that among the nutritive carriers there is one which is definitely and significantly superior to all of the others, and that a menadione bisulfite adduct-premix containing this carrier is characterized by a very substantially improved vitamin K potency retention with the passage of time at elevated temperature and relative humidity. The superior carrier referred to and that employed in the premix of the present invention is corn meal. Apparently, corn meal contains a chemical substance or group not contained in the other nutritive carriers, which chemical or group exerts a positive inhibiting action upon MBA. The precise nature of the inhibitor in corn meal is not known, but its effect is quite apparent in the tests reported hereinafter.

The premix of the present invention is prepared by simply forming a dry mixture of menadione bisulfite adduct, preferably menadione sodium bisulfite, and corn meal in the desired proportions. For example, 16 g. of MSB are added to sufficient corn meal to make a pound of the premix. By this simple procedure, premixes can be prepared containing from a minimum of about 4 g. to a practical maximum of about 250–260 g. MBA per pound. Throughout this broad range a premix containing a corn meal carrier retains its potency to a greater extent than a premix employing some other nutritive carrier, for example soy bean meal or wheat middlings. The premix of the present invention is particularly superior in the range of 4–128 g. dilutions. At the higher concentrations, e.g. 128 g./lb. and above, the vitamin K active material naturally tends to be more stable than in the very dilute premixes, regardless of the carrier.

In order to compare stability or vitamin K potency retention, typical premixes of average concentration (16 g. MSB per pound), were prepared employing three widely used carriers, soy bean meal, wheat middlings, and calcite. A premix was also prepared of the same concentration employing a corn meal carrier. As quickly as possible after preparation each premix was assayed for menadione sodium bisulfite and then placed in an oven which was maintained at 95° F. and 95% relative humidity. After 60, 90 and 120 hours, the samples were withdrawn and again assayed for MSB and the percent vitamin K potency retention was determined. The potency retention figures for each of the four premixes at the stated times are reported in the following table.

TABLE I

Carriers

[Percent vitamin K potency retention]

| Aging Conditions (Time at 95° F. and 95% R.H.) | Corn Meal | Soy bean Meal | Wheat Middlings | Calcite |
| --- | --- | --- | --- | --- |
| 60 hours | 80.9 | 60.3 | 68.2 | 33.2 |
| 90 hours | 74.6 | 39.2 | 47.5 | 27.3 |
| 120 hours | 70.8 | 36.4 | 42.5 | 27.2 |

The aging conditions employed were no more drastic than the premix would be subjected to upon standing in a very hot, moist climate.

It can be seen that the nutritive carriers are much better than calcite, and that in this 16 g. premix corn meal is vastly superior to either soy bean meal or wheat middlings, which until this time had been considered to be the best carriers, both from a nutritive point of view and as regards their effect upon stability of the vitamin K active material.

A further and more comprehensive series of tests was undertaken with five typical premixes containing from 4 to 64 g. per pound menadione sodium bisulfite. These samples were assayed immediately upon preparation and after aging and the percent vitamin K potency retention calculated. In this series of tests the samples were subjected to accelerated aging. Specifically, the samples were steamed for one and one-half minutes at seven and one-half pounds steam pressure. This steaming is equivalent to normal aging in air for a period of sixty hours at 115° F. and 80% R.H. The results of these tests were as follows.

TABLE II

Carriers

[Percent vitamin K potency retention]

| MSB Premix (Approx. g./lb.) | Corn Meal | Soy bean Meal | Wheat Middlings |
| --- | --- | --- | --- |
| 4 | 64.7 | 47.1 | 54.5 |
| 8 | 60.0 | 39.8 | 51.6 |
| 16 | 75.1 | 42.1 | 66.7 |
| 32 | 76.6 | 62.0 | 70.7 |
| 64 | 79.2 | 58.9 | 72.6 |

From the above it can be seen that at all dilutions the MSB-corn meal premix exhibits improved stability or vitamin K potency retention.

While the preferred premix of this invention employs a carrier which is all corn meal, it has been found that the stabilizing effects of this material are also realized when the carrier comprises a major portion of corn meal and a minor portion of one or more other nutritive carrier materials. For example, the carrier may be a mixture of corn meal and wheat middlings and/or soy bean meal, with corn meal constituting at least 50% by weight of the total carrier. A corn meal-wheat middlings carrier is entirely satisfactory. The other carrier will always be a nutritive, acid reacting material.

I claim:

1. A vitamin K composition of improved vitamin K stability after aging at elevated temperature and relative humidity, consisting essentially of at least 4 g. per pound of a water soluble menadione bisulfite adduct, a corn meal carrier therefor, and being substantially free of alkaline reacting solids, said composition constituting a vitamin K premix for combination with nutritional and supplemental feed components to form a complete animal feed.

2. A composition as set forth in claim 1 wherein the menadione bisulfite adduct is menadione sodium bisulfite, and is present in said composition in amounts between about 4 and 250 g. per pound.

3. A vitamin K composition of improved vitamin K stability after aging at elevated temperature and relative humidity, consisting essentially of at least 4 g. per pound of menadione sodium bisulfite and the balance substantially corn meal as a carrier therefor, said composition being substantially free of alkaline reacting solids and constituting a vitamin K premix for combination with nutritional and supplemental feed components to form a complete animal feed.

4. A vitamin K composition of improved vitamin K stability after aging at elevated temperature and relative humidity, consisting essentially of at least 4 g. per pound of menadione sodium bisulfite and a solid carrier therefor consisting of at least 50% by weight corn meal and the balance an acid reacting nutritive solid, said composition being substantially free of alkaline reacting solids and constituting a vitamin K premix for combination with nutritional and supplemental feed components to form a complete animal feed.

5. A vitamin K composition consisting essentially of at least 16 g. per pound menadione sodium bisulfite and corn meal as a carrier therefor, said composition being substantially free of alkaline reacting solids and characterized by a vitamin K potency retention of at least 75% upon steaming of the composition for one and one-half minutes at seven and one-half pounds steam pressure, said composition constituting a vitamin K premix for combination with nutritional and supplemental feed components to form a complete animal feed.

6. A vitamin K composition as set forth in claim 5 wherein the menadione sodium bisulfite is present in amounts of about 16 to 64 g. per pound thereof and the balance consists essentially of corn meal.

References Cited in the file of this patent

UNITED STATES PATENTS 2,777,797 Hochberg _____ Jan. 15, 1957
2,827,377 Frost _____ Mar. 18, 1958